(12) United States Patent
Leighton et al.

(10) Patent No.: US 9,641,482 B2
(45) Date of Patent: May 2, 2017

(54) GLOBAL HOSTING SYSTEM

(71) Applicant: Massachusetts Institute of Technology, Cambridge, MA (US)

(72) Inventors: F. Thomson Leighton, Newtonville, MA (US); Daniel M. Lewin, Charleston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/070,992

(22) Filed: Nov. 4, 2013

(65) Prior Publication Data

US 2014/0059248 A1    Feb. 27, 2014

Related U.S. Application Data

(63) Continuation of application No. 13/620,795, filed on Sep. 15, 2012, now Pat. No. 8,577,997, and a (Continued)

(51) Int. Cl.
    *G06F 15/173*      (2006.01)
    *G06F 15/16*      (2006.01)
    (Continued)

(52) U.S. Cl.
CPC ...... *H04L 61/2514* (2013.01); *G06F 17/3089* (2013.01); *G06F 17/30899* (2013.01); *H04L 29/06* (2013.01); *H04L 29/12066* (2013.01); *H04L 29/12594* (2013.01); *H04L 61/1511* (2013.01); *H04L 61/30* (2013.01); *H04L 67/101* (2013.01); *H04L 67/1008* (2013.01); *H04L 67/1019* (2013.01); *H04L 67/1021* (2013.01); *H04L 67/1023* (2013.01); *H04L 67/1029* (2013.01); *H04L 67/1034* (2013.01); *H04L 67/1095* (2013.01); *H04L 67/289* (2013.01); (Continued)

(58) Field of Classification Search
CPC ............ H04L 67/1002; H04L 67/1034; H04L 29/12066; H04L 61/2514; H04L 61/303; H04L 67/1023; H04L 67/1021; H04L 67/2838; H04L 67/289; H04L 61/151; G06F 17/30902
USPC .............. 709/214, 219, 226, 240, 245
See application file for complete search history.

(56) References Cited

U.S. PATENT DOCUMENTS 6,553,413 B1 * 4/2003 Leighton et al. ............. 709/219
7,240,100 B1 * 7/2007 Wein et al. .................... 709/214

* cited by examiner

*Primary Examiner* — Kristie Shingles
(74) *Attorney, Agent, or Firm* — David H. Judson

(57) ABSTRACT

Network architecture supports hosting and content distribution on a global scale. The architecture allows a Content Provider to replicate and serve its most popular content at an unlimited number of points throughout the world. The inventive framework comprises a set of servers operating in a distributed manner. The actual content to be served is preferably supported on a set of hosting servers (sometimes referred to as ghost servers). This content comprises HTML page objects that, conventionally, are served from a Content Provider site. A base HTML document portion of a Web page is served from the Content Provider's site while one or more embedded objects for the page are served from the hosting servers, preferably, those hosting servers near the client machine. By serving the base HTML document from the Content Provider's site, the Content Provider maintains control over the content.

9 Claims, 2 Drawing Sheets

Related U.S. Application Data continuation of application No. 13/310,851, filed on Dec. 5, 2011, now Pat. No. 8,271,617, and a continuation of application No. 12/753,988, filed on Apr. 5, 2010, now Pat. No. 8,073,961, and a continuation of application No. 11/515,171, filed on Sep. 1, 2006, now Pat. No. 7,693,959, and a continuation of application No. 10/417,607, filed on Apr. 17, 2003, now Pat. No. 7,103,645, and a continuation of application No. 09/604,878, filed on Jun. 28, 2000, now Pat. No. 6,553,413, and a continuation of application No. 09/314,863, filed on May 19, 1999, now Pat. No. 6,108,703.

(60) Provisional application No. 60/092,710, filed on Jul. 14, 1998.

(51) Int. Cl.
*H04L 29/12* (2006.01)
*H04L 29/08* (2006.01)
*H04L 29/06* (2006.01)
*G06F 17/30* (2006.01)

(52) U.S. Cl.
CPC ...... *H04L 67/2814* (2013.01); *H04L 67/2838* (2013.01); *H04L 67/2842* (2013.01); *G06F 17/30902* (2013.01); *H04L 67/1002* (2013.01); *H04L 2029/06054* (2013.01)

GLOBAL HOSTING SYSTEM

BACKGROUND OF THE INVENTION

1. Technical Field

This invention relates generally to information retrieval in a computer network. More particularly, the invention relates to a novel method of hosting and distributing content on the Internet that addresses the problems of Internet Service Providers (ISPs) and Internet Content Providers.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server identified in the link and, in return, receives a document or other object formatted according to HTML. A collection of documents supported on a Web server is sometimes referred to as a Web site.

It is well known in the prior art for a Web site to mirror its content at another server. Indeed, at present, the only method for a Content Provider to place its content closer to its readers is to build copies of its Web site on machines that are located at Web hosting farms in different locations domestically and internationally. These copies of Web sites are known as mirror sites. Unfortunately, minor sites place unnecessary economic and operational burdens on Content Providers, and they do not offer economies of scale. Economically, the overall cost to a Content Provider with one primary site and one mirror site is more than twice the cost of a single primary site. This additional cost is the result of two factors: (1) the Content Provider must contract with a separate hosting facility for each mirror site, and (2) the Content Provider must incur additional overhead expenses associated with keeping the minor sites synchronized.

In an effort to address problems associated with mirroring, companies such as Cisco, Resonate, Bright Tiger, F5 Labs and Alteon, are developing software and hardware that will help keep minor sites synchronized and load balanced. Although these mechanisms are helpful to the Content Provider, they fail to address the underlying problem of scalability. Even if a Content Provider is willing to incur the costs associated with mirroring, the technology itself will not scale beyond a few (i.e., less than 10) Web sites.

In addition to these economic and scalability issues, minoring also entails operational difficulties. A Content Provider that uses a minor site must not only lease and manage physical space in distant locations, but it must also buy and maintain the software or hardware that synchronizes and load balances the sites. Current solutions require Content Providers to supply personnel, technology and other items necessary to maintain multiple Web sites. In summary, mirroring requires Content Providers to waste economic and other resources on functions that are not relevant to their core business of creating content.

Moreover, Content Providers also desire to retain control of their content. Today, some ISPs are installing caching hardware that interrupts the link between the Content Provider and the end-user. The effect of such caching can produce devastating results to the Content Provider, including (1) preventing the Content Provider from obtaining accurate hit counts on its Web pages (thereby decreasing revenue from advertisers), (2) preventing the Content Provider from tailoring content and advertising to specific audiences (which severely limits the effectiveness of the Content Provider's Web page), and (3) providing outdated information to its customers (which can lead to a frustrated and angry end user).

There remains a significant need in the art to provide a decentralized hosting solution that enables users to obtain Internet content on a more efficient basis (i.e., without burdening network resources unnecessarily) and that likewise enables the Content Provider to maintain control over its content.

The present invention solves these and other problems associated with the prior art.

BRIEF SUMMARY

It is a general object of the present invention to provide a computer network comprising a large number of widely deployed Internet servers that form an organic, massively fault-tolerant infrastructure designed to serve Web content efficiently, effectively, and reliably to end users.

Another more general object of the present invention is to provide a fundamentally new and better method to distribute Web-based content. The inventive architecture provides a method for intelligently routing and replicating content over a large network of distributed servers, preferably with no centralized control.

Another object of the present invention is to provide a network architecture that moves content close to the user. The inventive architecture allows Web sites to develop large audiences without worrying about building a massive infrastructure to handle the associated traffic.

Still another object of the present invention is to provide a fault-tolerant network for distributing Web content. The network architecture is used to speed-up the delivery of richer Web pages, and it allows Content Providers with large audiences to serve them reliably and economically, preferably from servers located close to end users.

A further feature of the present invention is the ability to distribute and manage content over a large network without disrupting the Content Provider's direct relationship with the end user.

Yet another feature of the present invention is to provide a distributed scalable infrastructure for the Internet that shifts the burden of Web content distribution from the Content Provider to a network of preferably hundreds of hosting servers deployed, for example, on a global basis.

In general, the present invention is a network architecture that supports hosting on a truly global scale. The inventive framework allows a Content Provider to replicate its most popular content at an unlimited number of points throughout the world. As an additional feature, the actual content that is replicated at any one geographic location is specifically tailored to viewers in that location. Moreover, content is automatically sent to the location where it is requested, without any effort or overhead on the part of a Content Provider.

It is thus a more general object of this invention to provide a global hosting framework to enable Content Providers to retain control of their content.

The hosting framework of the present invention comprises a set of servers operating in a distributed manner. The actual content to be served is preferably supported on a set of hosting servers (sometimes referred to as ghost servers). This content comprises HTML page objects that, conventionally, are served from a Content Provider site. In accordance with the invention, however, a base HTML document portion of a Web page is served from the Content Provider's site while one or more embedded objects for the page are served from the hosting servers, preferably, those hosting servers nearest the client machine. By serving the base HTML document from the Content Provider's site, the Content Provider maintains control over the content.

The determination of which hosting server to use to serve a given embedded object is effected by other resources in the hosting framework. In particular, the framework includes a second set of servers (or server resources) that are configured to provide top level Domain Name Service (DNS). In addition, the framework also includes a third set of servers (or server resources) that are configured to provide low level DNS functionality. When a client machine issues an HTTP request to the Web site for a given Web page, the base HMTL document is served from the Web site as previously noted. Embedded objects for the page preferably are served from particular hosting servers identified by the top- and low-level DNS servers. To locate the appropriate hosting servers to use, the top-level DNS server determines the user's location in the network to identify a given low-level DNS server to respond to the request for the embedded object. The top-level DNS server then redirects the request to the identified low-level DNS server that, in turn, resolves the request into an IP address for the given hosting server that serves the object back to the client.

More generally, it is possible (and, in some cases, desirable) to have a hierarchy of DNS servers that consisting of several levels. The lower one moves in the hierarchy, the closer one gets to the best region.

A further aspect of the invention is a means by which content can be distributed and replicated through a collection of servers so that the use of memory is optimized subject to the constraints that there are a sufficient number of copies of any object to satisfy the demand, the copies of objects are spread so that no server becomes overloaded, copies tend to be located on the same servers as time moves forward, and copies are located in regions close to the clients that are requesting them. Thus, servers operating within the framework do not keep copies of all of the content database. Rather, given servers keep copies of a minimal amount of data so that the entire system provides the required level of service. This aspect of the invention allows the hosting scheme to be far more efficient than schemes that cache everything everywhere, or that cache objects only in pre-specified locations.

The global hosting framework is fault tolerant at each level of operation. In particular, the top level DNS server returns a list of low-level DNS servers that may be used by the client to service the request for the embedded object Likewise, each hosting server preferably includes a buddy server that is used to assume the hosting responsibilities of its associated hosting server in the event of a failure condition.

According to the present invention, load balancing across the set of hosting servers is achieved in part through a novel technique for distributing the embedded object requests. In particular, each embedded object URL is preferably modified by prepending a virtual server hostname into the URL. More generally, the virtual server hostname is inserted into the URL. Preferably, the virtual server hostname includes a value (sometimes referred to as a serial number) generated by applying a given hash function to the URL or by encoding given information about the object into the value. This function serves to randomly distribute the embedded objects over a given set of virtual server hostnames. In addition, a given fingerprint value for the embedded object is generated by applying a given hash function to the embedded object itself. This given value serves as a fingerprint that identifies whether the embedded object has been modified. Preferably, the functions used to generate the values (i.e., for the virtual server hostname and the fingerprint) are applied to a given Web page in an off-line process. Thus, when an HTTP request for the page is received, the base HTML document is served by the Web site and some portion of the page's embedded objects are served from the hosting servers near (although not necessarily the closest) to the client machine that initiated the request.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
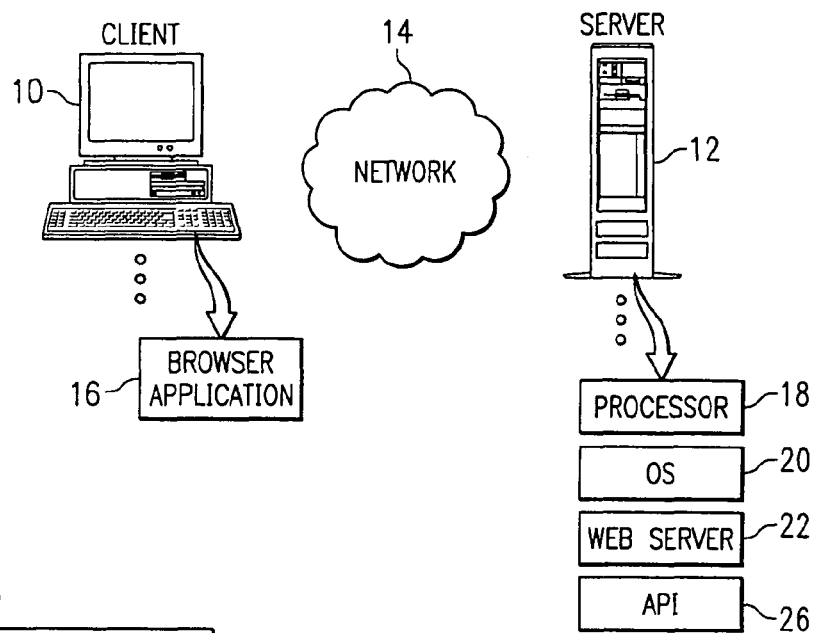
FIG. 1 is a representative system in which the present invention is implemented.

A known Internet client-server system is implemented as illustrated in FIG. 1. A client machine 10 is connected to a Web server 12 via a network 14. For illustrative purposes, network 14 is the Internet, an intranet, an extranet or any other known network. Web server 12 is one of a plurality of servers which are accessible by clients, one of which is illustrated by machine 10. A representative client machine includes a browser 16, which is a known software tool used to access the servers of the network. The Web server supports files (collectively referred to as a "Web" site) in the form of hypertext documents and objects. In the Internet paradigm, a network path to a server is identified by a so-called Uniform Resource Locator (URL).

A representative Web server 12 is a computer comprising a processor 18, an operating system 20, and a Web server program 22, such as Netscape Enterprise Server. The server 12 also includes a display supporting a graphical user interface (GUI) for management and administration, and an Application Programming Interface (API) that provides extensions to enable application developers to extend and/or customize the core functionality thereof through software programs including Common Gateway Interface (CGI) programs, plug-ins, servlets, active server pages, server side include (SSI) functions or the like.

A representative Web client is a personal computer that is x86-, PowerPC- or RISC-based, that includes an operating system such as IBM OS/2 or Microsoft Windows '95, and that includes a Web browser, such as Netscape Navigator 4.0 (or higher), having a Java Virtual Machine (JVM) and support for application plug-ins or helper applications. A client may also be a notebook computer, a handheld computing device (e.g., a PDA), an Internet appliance, or any other such device connectable to the computer network.

Figure 2:
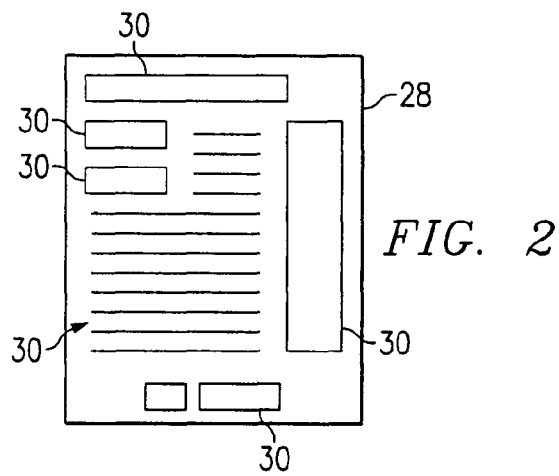
FIG. 2 is a simplified representation of a markup language document illustrating the base document and a set of embedded objects.

As seen in FIG. 2, a typical Web page comprises a markup language (e.g. HTML) master or base document 28, and many embedded objects (e.g., images, audio, video, or the like) 30. Thus, in a typical page, twenty or more embedded images or objects are quite common. Each of these images is an independent object in the Web, retrieved (or validated for change) separately. The common behavior of a Web client, therefore, is to fetch the base HTML document, and then immediately fetch the embedded objects, which are typically (but not always) located on the same server. According to the present invention, preferably the markup language base document 28 is served from the Web server (i.e., the Content Provider site) whereas a given number (or perhaps all) of the embedded objects are served from other servers. As will be seen, preferably a given embedded object is served from a server (other than the Web server itself) that is close to the client machine, that is not overloaded, and that is most likely to already have a current version of the required file.

Figure 3:
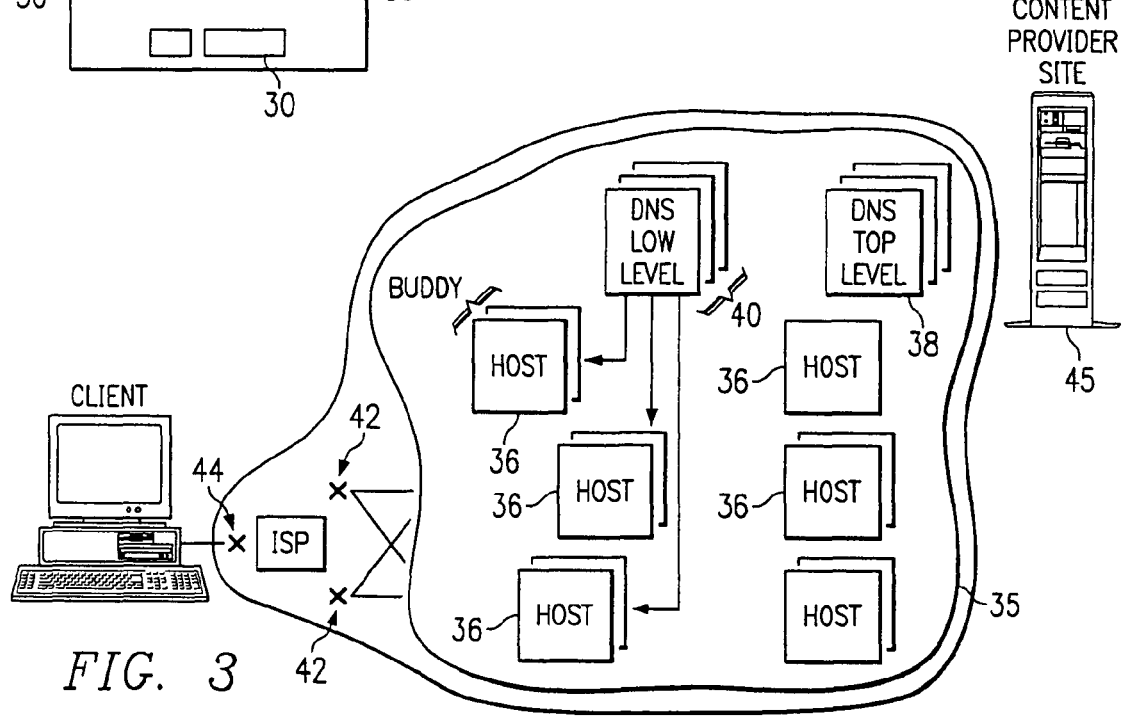
FIG. 3 is a high level diagram of a global hosting system according to the present invention.

Referring now to FIG. 3, this operation is achieved by the hosting system of the present invention. As will be seen, the hosting system 35 comprises a set of widely-deployed servers (or server resources) that form a large, fault-tolerant infrastructure designed to serve Web content efficiently, effectively, and reliably to end users. The servers may be deployed globally, or across any desired geographic regions. As will be seen, the hosting system provides a distributed architecture for intelligently routing and replicating such content. To this end, the global hosting system 35 comprises three (3) basic types of servers (or server resources): hosting servers (sometimes called ghosts) 36, top-level DNS servers 38, and low-level DNS servers 40. Although not illustrated, there may be additional levels in the DNS hierarchy. Alternatively, there may be a single DNS level that combines the functionality of the top level and low-level servers. In this illustrative embodiment, the inventive framework 35 is deployed by an Internet Service Provider (ISP), although this is not a limitation of the present invention. The ISP or ISPs that deploy the inventive global hosting framework 35 preferably have a large number of machines that run both the ghost server component 36 and the low-level DNS component 40 on their networks. These machines are distributed throughout the network; preferably, they are concentrated around network exchange points 42 and network access points 44, although this is not a requirement. In addition, the ISP preferably has a small number of machines running the top-level DNS 38 that may also be distributed throughout the network.

Although not meant to be limiting, preferably a given server used in the framework 35 includes a processor, an operating system (e.g., Linux, UNIX, Windows NT, or the like), a Web server application, and a set of application routines used by the invention. These routines are conveniently implemented in software as a set of instructions executed by the processor to perform various process or method steps as will be described in more detail below. The servers are preferably located at the edges of the network (e.g., in points of presence, or POPs).

Several factors may determine where the hosting servers are placed in the network. Thus, for example, the server locations are preferably determined by a demand driven network map that allows the provider (e.g., the ISP) to monitor traffic requests. By studying traffic patterns, the ISP may optimize the server locations for the given traffic profiles.

According to the present invention, a given Web page (comprising a base HTML document and a set of embedded objects) is served in a distributed manner. Thus, preferably, the base HTML document is served from the Content Provider that normally hosts the page. The embedded objects, or some subset thereof, are preferentially served from the hosting servers 36 and, specifically, given hosting servers 36 that are near the client machine that in the first instance initiated the request for the Web page. In addition, preferably loads across the hosting servers are balanced to ensure that a given embedded object may be efficiently served from a given hosting server near the client when such client requires that object to complete the page.

Figure 4:
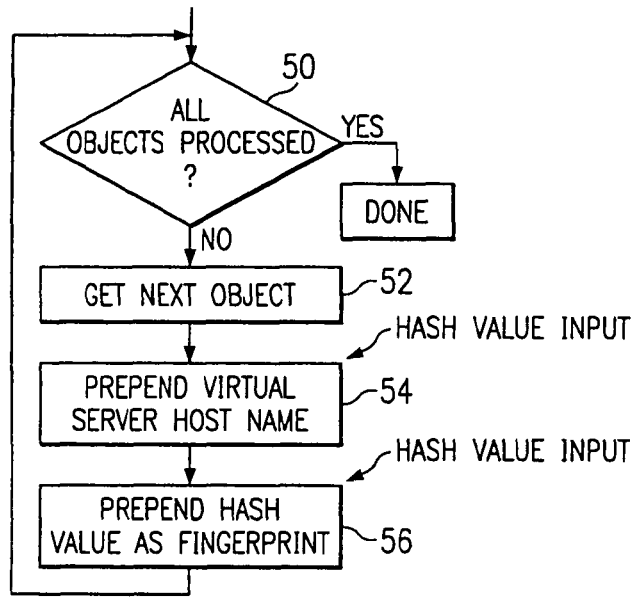
FIG. 4 is a simplified flowchart illustrating a method of processing a Web page to modified embedded object URLs that is used in the present invention.

To serve the page contents in this manner, the URL associated with an embedded object is modified. As is well-known, each embedded object that may be served in a page has its own URL. Typically, the URL has a hostname identifying the Content Provider's site from where the object is conventionally served, i.e., without reference to the present invention. According to the invention, the embedded object URL is first modified, preferably in an off-line process, to condition the URL to be served by the global hosting servers. A flowchart illustrating the preferred method for modifying the object URL is illustrated in FIG. 4.

The routine begins at step 50 by determining whether all of the embedded objects in a given page have been processed. If so, the routine ends. If not, however, the routine gets the next embedded object at step 52. At step 54, a virtual server hostname is prepended into the URL for the given embedded object. The virtual server hostname includes a value (e.g., a number) that is generated, for example, by applying a given hash function to the URL. As is well-known, a hash function takes arbitrary length bit strings as inputs and produces fixed length bit strings (hash values) as outputs. Such functions satisfy two conditions: (1) it is infeasible to find two different inputs that produce the same hash value, and (2) given an input and its hash value, it is infeasible to find a different input with the same hash value. In step 54, the URL for the embedded object is hashed into a value xx,xxx that is then included in the virtual server hostname. This step randomly distributes the object to a given virtual server hostname.

The present invention is not limited to generating the virtual server hostname by applying a hash function as described above. As an alternative and preferred embodiment, a virtual server hostname is generated as follows. Consider the representative hostname a1234.g.akamaitech.net. The 1234 value, sometimes referred to as a serial number, preferably includes information about the object such as its size (big or small), its anticipated popularity, the date on which the object was created, the identity of the Web site, the type of object (e.g., movie or static picture), and perhaps some random bits generated by a given random function. Of course, it is not required that any given serial number encode all of such information or even a significant number of such components. Indeed, in the simplest case, the serial number may be a simple integer. In any event, the information is encoded into a serial number in any convenient manner. Thus, for example, a first bit is used to denote size, a second bit is used to denote popularity, a set of additional bits is used to denote the date, and so forth. As noted above in the hashing example, the serial number is also used for load balancing and for directing certain types of traffic to certain types of servers. Typically, most URLs on the same page have the same serial number to minimize the number of distinguished name (DN) accesses needed per page. This requirement is less important for larger objects.

Thus, according to the present invention, a virtual server hostname is prepended into the URL for a given embedded object, and this hostname includes a value (or serial number) that is generated by applying a given function to the URL or object. That function may be a hash function, an encoding function, or the like.

Turning now back to the flowchart, the routine then continues at step 56 to include a given value in the object's URL. Preferably, the given value is generated by applying a given hash function to the embedded object. This step creates a unique fingerprint of the object that is useful for determining whether the object has been modified. Thereafter, the routine returns to step 50 and cycles.

Figure 5:
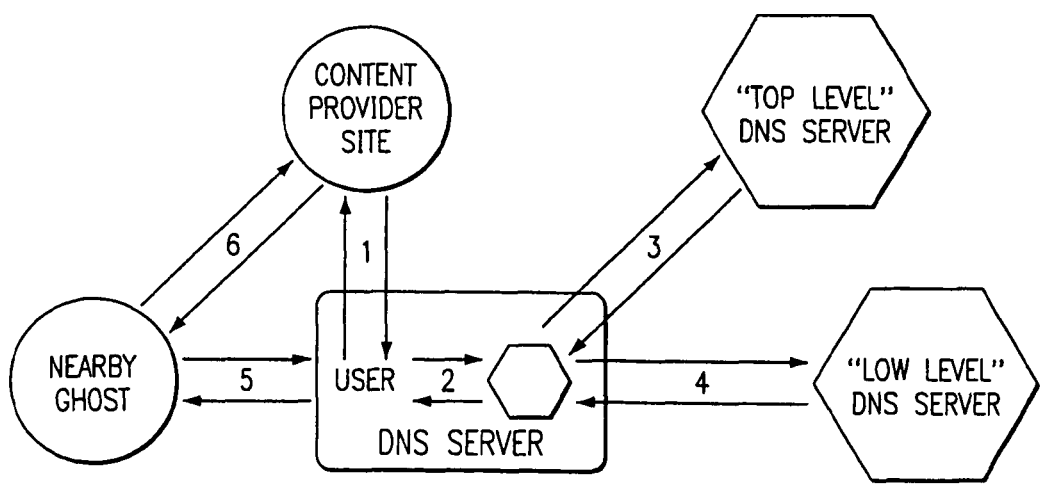
FIG. 5 is a simplified state diagram illustrating how the present invention responds to a HTTP request for a Web page.

With the above as background, the inventive global hosting framework is now described in the context of a specific example. In particular, it is assumed that a user of a client machine in Boston requests a Content Provider Web page normally hosted in Atlanta. For illustrative purposes, it is assumed that the Content Provider is using the global hosting architecture within a network, which may be global, international, national, regional, local or private. FIG. 5 shows the various components of the system and how the request from the client is processed. This operation is not to be taken by way of limitation, as will be explained.

Step 1: The browser sends a request to the Provider's Web site (Item 1). The Content Provider site in Atlanta receives the request in the same way that it does as if the global hosting framework were not being implemented. The difference is in what is returned by the Provider site. Instead of returning the usual page, according to the invention, the Web site returns a page with embedded object URLs that are modified according to the method illustrated in the flowchart of FIG. 4. As previously described, the URLs preferably are changed as follows:

Assume that there are 100,000 virtual ghost servers, even though there may only be a relatively small number (e.g., 100) physically present on the network. These virtual ghost servers or virtual ghosts are identified by the hostname: ghostxxxxx.ghosting.com, where xxxxx is replaced by a number between 0 and 99,999. After the Content Provider Web site is updated with new information, a script executing on the Content Provider site is run that rewrites the embedded URLs. Preferably, the embedded URLs names are hashed into numbers between 0 and 99,999, although this range is not a limitation of the present invention. An embedded URL is then switched to reference the virtual ghost with that number. For example, the following is an embedded URL from the Provider's site:

<IMG SRC=http://www.provider.com/TECH/images/space.story.gif>

If the serial number for the object referred to by this URL is the number 1467, then preferably the URL is rewritten to read:

<IMG SRC=http: //ghost467.ghosting.akamai.com/www.provider.com/TECH/images/sp ace.story.gif>.

The use of serial numbers in this manner distributes the embedded URLs roughly evenly over the 100,000 virtual ghost server names. Note that the Provider site can still personalize the page by rearranging the various objects on the screen according to individual preferences. Moreover, the Provider can also insert advertisements dynamically and count how many people view each ad.

According to the preferred embodiment, an additional modification to the embedded URLs is made to ensure that the global hosting system does not serve stale information. As previously described, preferably a hash of the data contained in the embedded URL is also inserted into the embedded URL itself. That is, each embedded URL may contain a fingerprint of the data to which it points. When the underlying information changes, so does the fingerprint, and this prevents users from referencing old data.

The second hash takes as input a stream of bits and outputs what is sometimes referred to as a fingerprint of the stream. The important property of the fingerprint is that two different streams almost surely produce two different fingerprints. Examples of such hashes are the MD2 and MD5 hash functions, however, other more transparent methods such as a simple checksum may be used. For concreteness, assume that the output of the hash is a 128 bit signature. This signature can be interpreted as a number and then inserted into the embedded URL. For example, if the hash of the data in the picture space.story.gif from the Provider web site is the number 28765, then the modified embedded URL would actually look as follows:

<IMGSRC=http://ghost1467.ghosting.akamai.com/28765/www.provider.com/TECH/images/space.story.gif">.

Whenever a page is changed, preferably the hash for each embedded URL is recomputed and the URL is rewritten if necessary. If any of the URL's data changes, for example, a new and different picture is inserted with the name space.story.gif, then the hash of the data is different and therefore the URL itself will be different. This scheme prevents the system from serving data that is stale as a result of updates to the original page.

For example, assume that the picture space.story.gif is replaced with a more up-to-date version on the Content Provider server. Because the data of the pictures changes, the hash of the URL changes as well. Thus, the new embedded URL looks the same except that a new number is inserted for the fingerprint. Any user that requests the page after the update receives a page that points to the new picture. The old picture is never referenced and cannot be mistakenly returned in place of the more up-to-date information.

In summary, preferably there are two hashing operations that are done to modify the pages of the Content Provider. First, hashing can be a component of the process by which a serial number is selected to transform the domain name into a virtual ghost name. As will be seen, this first transformation serves to redirect clients to the global hosting system to retrieve the embedded URLs. Next, a hash of the data pointed to by the embedded URLs is computed and inserted into the URL. This second transformation serves to protect against serving stale and out-of-date content from the ghost servers. Preferably, these two transformations are performed off-line and therefore do not pose potential performance bottlenecks.

Generalizing, the preferred URL schema is as follows. The illustrative domain www.domainname.com/frontpage.jpg is transformed into:
xxxx.yy.zzzz.net/aaaa/www.domainname.com/frontpage.jpg,
where:
xxxx=serial number field
yy=lower level DNS field
zzzz=top level DNS field
aaaa=other information (e.g., fingerprint) field.
If additional levels of the DNS hierarchy are used, then there may be additional lower level DNS fields, e.g., xxxx.y.sub.1 y.sub.1.y.sub.2 y.sub.2 zzz.net/aaaa/. . . .

Step 2: After receiving the initial page from the Content Provider site, the browser needs to load the embedded URLs to display the page. The first step in doing this is to contact the DNS server on the user's machine (or at the user's ISP) to resolve the altered hostname, in this case: ghost1467.ghosting.akamai.com. As will be seen, the global hosting architecture of the present invention manipulates the DNS system so that the name is resolved to one of the ghosts that is near the client and is likely to have the page already. To appreciate how this is done, the following describes the progress of the DNS query that was initiated by the client.

Step 3: As previously described, preferably there are two types of DNS servers in the inventive system: top-level and low-level. The top level DNS servers 38 for ghosting.com have a special function that is different from regular DNS servers like those of the .com domain. The top level DNS servers 38 include appropriate control routines that are used to determine where in the network a user is located, and then to direct the user to a akamai.com (i.e., a low level DNS) server 40 that is close-by. Like the .com domain, akamai.com preferably has a number of top-level DNS servers 38 spread throughout the network for fault tolerance. Thus, a given top level DNS server 38 directs the user to a region in the Internet (having a collection of hosting servers 36 that may be used to satisfy the request for a given embedded object) whereas the low level DNS server 40 (within the identified region) identifies a particular hosting server within that collection from which the object is actually served.

More generally, as noted above, the DNS process can contain several levels of processing, each of which serves to better direct the client to a ghost server. The ghost server name can also have more fields. For example, "a123.g.g.akamaitech.net" may be used instead of "a123.ghost.akamai.com." If only one DNS level is used, a representative URL could be "a123.akamai.com."

Although other techniques may be used, the user's location in the network preferably is deduced by looking at the IP address of the client machine making the request. In the present example, the DNS server is running on the machine of the user, although this is not a requirement. If the user is using an ISP DNS server, for example, the routines make the assumption that the user is located near (in the Internet sense) this server. Alternatively, the user's location or IP address could be directly encoded into the request sent to the top level DNS. To determine the physical location of an IP address in the network, preferably, the top level DNS server builds a network map that is then used to identify the relevant location.

Thus, for example, when a request comes in to a top level DNS for a resolution for a1234.g.akamaitech.net, the top level DNS looks at the return address of the requester and then formulates the response based on that address according to a network map. In this example, the a1234 is a serial number, the g is a field that refers to the lower level DNS, and akamaitech refers to the top level DNS. The network map preferably contains a list of all Internet Protocol (IP) blocks and, for each IP block, the map determines where to direct the request. The map preferably is updated continually based on network conditions and traffic.

After determining where in the network the request originated, the top level DNS server redirects the DNS request to a low level DNS server close to the user in the network. The ability to redirect requests is a standard feature in the DNS system. In addition, this redirection can be done in such a way that if the local low level DNS server is down, there is a backup server that is contacted.

Preferably, the TTL (time to live) stamp on these top level DNS redirections for the ghosting.com domain is set to be long. This allows DNS caching at the user's DNS servers and/or the ISP's DNS servers to prevent the top level DNS servers from being overloaded. If the TTL for ghosting.akamai.com in the DNS server at the user's machine or ISP has expired, then a top level server is contacted, and a new redirection to a local low level ghosting.akamai.com DNS server is returned with a new TTL stamp. It should be noted the system does not cause a substantially larger number of top level DNS lookups than what is done in the current centralized hosting solutions. This is because the TTL of the top level redirections are set to be high and, thus, the vast majority of users are directed by their local DNS straight to a nearby low level ghosting.akamai.com DNS server.

Moreover, fault tolerance for the top level DNS servers is provided automatically by DNS similarly to what is done for the popular .com domain. Fault tolerance for the low level DNS servers preferably is provided by returning a list of possible low level DNS servers instead of just a single server. If one of the low level DNS servers is down, the user will still be able to contact one on the list that is up and running.

Fault tolerance can also be handled via an "overflow control" mechanism wherein the client is redirected to a low-level DNS in a region that is known to have sufficient capacity to serve the object. This alternate approach is very useful in scenarios where there is a large amount of demand from a specific region or when there is reduced capacity in a region. In general, the clients are directed to regions in a way that minimizes the overall latency experienced by clients subject to the constraint that no region becomes overloaded. Minimizing overall latency subject to the regional capacity constraints preferably is achieved using a min-cost multi-commodity flow algorithm.

Step 4: At this point, the user has the address of a close-by ghosting.com DNS server 38. The user's local DNS server contacts the close-by low level DNS server 40 and requests a translation for the name ghost1467.ghosting.akamai.com. The local DNS server is responsible for returning the IP address of one of the ghost servers 36 on the network that is close to the user, not overloaded, and most likely to already have the required data.

The basic mechanism for mapping the virtual ghost names to real ghosts is hashing. One preferred technique is so-called consistent hashing, as described in U.S. Ser. No. 09/042,228, filed Mar. 13, 1998, and in U.S. Ser. No. 09/088,825, filed Jun. 2, 1998, each titled Method And Apparatus For Distributing Requests Among A Plurality Of Resources, and owned by the Massachusetts Institute of Technology, which applications are incorporated herein by reference. Consistent hash functions make the system robust under machine failures and crashes. It also allows the system to grow gracefully, without changing where most items are located and without perfect information about the system.

According to the invention, the virtual ghost names may be hashed into real ghost addresses using a table lookup, where the table is continually updated based on network conditions and traffic in such a way to insure load balancing and fault tolerance. Preferably, a table of resolutions is created for each serial number. For example, serial number 1 resolves to ghost 2 and 5, serial number 2 resolves to ghost 3, serial number 3 resolves to ghosts 2, 3, 4, and so forth. The goal is to define the resolutions so that no ghost exceeds its capacity and that the total number of all ghosts in all resolutions is minimized. This is done to assure that the system can take maximal advantage of the available memory at each region. This is a major advantage over existing load balancing schemes that tend to cache everything everywhere or that only cache certain objects in certain locations no matter what the loads are. In general, it is desirable to make assignments so that resolutions tend to stay consistent over time provided that the loads do not change too much in a short period of time. This mechanism preferably also takes into account how close the ghost is to the user, and how heavily loaded the ghost is at the moment.

Note that the same virtual ghost preferably is translated to different real ghost addresses according to where the user is located in the network. For example, assume that ghost server 18.98.0.17 is located in the United States and that ghost server 132.68.1.28 is located in Israel. A DNS request for ghost1487.ghosting.akamai.com originating in Boston will resolve to 18.98.0.17, while a request originating in Tel-Aviv will resolve to 132.68.1.28.

The low-level DNS servers monitor the various ghost servers to take into account their loads while translating virtual ghost names into real addresses. This is handled by a software routine that runs on the ghosts and on the low level DNS servers. In one embodiment, the load information is circulated among the servers in a region so that they can compute resolutions for each serial number. One algorithm for computing resolutions works as follows. The server first computes the projected load (based on number of user requests) for each serial number. The serial numbers are then processed in increasing order of load. For each serial number, a random priority list of desired servers is assigned using a consistent hashing method. Each serial number is then resolved to the smallest initial segment of servers from the priority list so that no server becomes overloaded. For example, if the priority list for a serial number is 2, 5, 3, 1, 6, then an attempt is made first to try to map the load for the serial number to ghost 2. If this overloads ghost 2, then the load is assigned to both ghosts 2 and 5. If this produced too much load on either of those servers, then the load is assigned to ghosts 2, 3, and 5, and so forth. The projected load on a server can be computed by looking at all resolutions that contain that server and by adding the amount of load that is likely to be sent to that server from that serial number. This method of producing resolutions is most effective when used in an iterative fashion, wherein the assignments start in a default state, where every serial number is mapped to every ghost. By refining the resolution table according to the previous procedure, the load is balanced using the minimum amount of replication (thereby maximally conserving the available memory in a region).

The TTL for these low level DNS translations is set to be short to allow a quick response when heavy load is detected on one of the ghosts. The TTL is a parameter that can be manipulated by the system to insure a balance between timely response to high load on ghosts and the load induced on the low level DNS servers. Note, however, that even if the TTL for the low level DNS translation is set to 1-2 minutes, only a few of the users actually have to do a low level DNS lookup. Most users will see a DNS translation that is cached on their machine or at their ISP. Thus, most users go directly from their local DNS server to the close-by ghost that has the data they want. Those users that actually do a low level DNS lookup have a very small added latency, however this latency is small compared to the advantage of retrieving most of the data from close by.

As noted above, fault tolerance for the low level DNS servers is provided by having the top level DNS return a list of possible low level DNS servers instead of a single server address. The user's DNS system caches this list (part of the standard DNS system), and contacts one of the other servers on the list if the first one is down for some reason. The low level DNS servers make use of a standard feature of DNS to provide an extra level of fault tolerance for the ghost servers. When a name is translated, instead of returning a single name, a list of names is returned. If for some reason the primary fault tolerance method for the ghosts (known as the Buddy system, which is described below) fails, the client browser will contact one of the other ghosts on the list.

Step 5: The browser then makes a request for an object named a123.ghosting.akamai.com/.../www.provider.com/TECH/images/space.story.gif from the close-by ghost. Note that the name of the original server (www.provider.com) preferably is included as part of the URL. The software running on the ghost parses the page name into the original host name and the real page name. If a copy of the file is already stored on the ghost, then the data is returned immediately. If, however, no copy of the data on the ghost exists, a copy is retrieved from the original server or another ghost server. Note that the ghost knows who the original server was because the name was encoded into the URL that was passed to the ghost from the browser. Once a copy has been retrieved it is returned to the user, and preferably it is also stored on the ghost for answering future requests.

As an additional safeguard, it may be preferable to check that the user is indeed close to the server. This can be done by examining the IP address of the client before responding to the request for the file. This is useful in the rare case when the client's DNS server is far away from the client. In such a case, the ghost server can redirect the user to a closer server (or to another virtual address that is likely to be resolved to a server that is closer to the client). If the redirect is to a virtual server, then it must be tagged to prevent further redirections from taking place. In the preferred embodiment, redirection would only be done for large objects; thus, a check may be made before applying a redirection to be sure that the object being requested exceeds a certain overall size.

Performance for long downloads can also be improved by dynamically changing the server to which a client is connected based on changing network conditions. This is especially helpful for audio and video downloads (where the connections can be long and where quality is especially important). In such cases, the user can be directed to an alternate server in midstream. The control structure for redirecting the client can be similar to that described above, but it can also include software that is placed in the client's browser or media player. The software monitors the performance of the client's connection and perhaps the status of the network as well. If it is deemed that the client's connection can be improved by changing the server, then the system directs the client to a new server for the rest of the connection.

Fault tolerance for the ghosts is provided by a buddy system, where each ghost has a designated buddy ghost. If a ghost goes down, its buddy takes over its work (and IP address) so that service is not interrupted. Another feature of the system is that the buddy ghost does not have to sit idle waiting for a failure. Instead, all of the machines are always active, and when a failure happens, the load is taken over by the buddy and then balanced by the low level DNS system to the other active ghosts. An additional feature of the buddy system is that fault tolerance is provided without having to wait for long Timeout periods.

As yet another safety feature of the global hosting system, a gating mechanism can be used to keep the overall traffic for certain objects within specified limits. One embodiment of the gating mechanism works as follows. When the number of requests for an object exceeds a certain specified threshold, then the server can elect to not serve the object. This can be very useful if the object is very large. Instead, the client can be served a much smaller object that asks the client to return later. Or, the client can be redirected. Another method of implementing a gate is to provide the client with a "ticket" that allows the client to receive the object at a pre-specified future time. In this method, the ghost server needs to check the time on the ticket before serving the object.

The inventive global hosting scheme is a way for global ISPs or conglomerates of regional ISPs to leverage their network infrastructure to generate hosting revenue, and to save on network bandwidth. An ISP offering the inventive global hosting scheme can give content providers the ability to distribute content to their users from the closest point on the ISPs network, thus ensuring fast and reliable access. Guaranteed web site performance is critical for any web-based business, and global hosting allows for the creation of a service that satisfies this need.

Global hosting according to the present invention also allows an ISP to control how and where content traverses its network. Global hosting servers can be set up at the edges of the ISP's network (at the many network exchange and access points, for example). This enables the ISP to serve content for sites that it hosts directly into the network exchange points and access points. Expensive backbone links no longer have to carry redundant traffic from the content provider's site to the network exchange and access points. Instead, the content is served directly out of the ISP's network, freeing valuable network resources for other traffic.

Although global hosting reduces network traffic, it is also a method by which global ISPs may capture a piece of the rapidly expanding hosting market, which is currently estimated at over a billion dollars a year.

The global hosting solution also provides numerous advantages to Content Providers, and, in particular, an efficient and cost-effective solution to improve the performance of their Web sites both domestically and internationally. The inventive hosting software ensures Content Providers with fast and reliable Internet access by providing a means to distribute content to their subscribers from the closest point on an ISP's network. In addition to other benefits described in more detail below, the global hosting solution also provides the important benefit of reducing network traffic.

Once inexpensive global hosting servers are installed at the periphery of an ISP's network (i.e., at the many network exchange and access points), content is served directly into network exchange and access points. As a result of this efficient distribution of content directly from an ISP's network, the present invention substantially improves Web site performance. In contrast to current content distribution systems, the inventive global hosting solution does not require expensive backbone links to carry redundant traffic from the Content Provider's Web site to the network exchange and access points.

A summary of the specific advantages afforded by the inventive global hosting scheme are set forth below:

1. Decreased Operational Expenses for Content Providers:

Most competing solutions require Content Providers to purchase servers at each Web site that hosts their content. As a result, Content Providers often must negotiate separate contracts with different ISPs around the world. In addition, Content Providers are generally responsible for replicating the content and maintaining servers in these remote locations.

With the present invention, ISPs are primarily responsible for the majority of the aspects of the global hosting. Content Providers preferably maintain only their single source server. Content on this server is automatically replicated by software to the locations where it is being accessed. No intervention or planning is needed by the Provider (or, for that matter, the ISP). Content Providers are offered instant access to all of the servers on the global network; there is no need to choose where content should be replicated or to purchase additional servers in remote locations.

2. Intelligent and Efficient Data Replication:

Most competing solutions require Content Providers to replicate their content on servers at a commercial hosting site or to minor their content on geographically distant servers. Neither approach is particularly efficient. In the former situation, content is still located at a single location on the Internet (and thus it is far away from most users). In the latter case, the entire content of a Web site is copied to remote servers, even though only a small portion of the content may actually need to be located remotely. Even with inexpensive memory, the excessive cost associated with such mirroring makes it uneconomical to minor to more than a few sites, which means that most users will still be far away from a mirror site. Mirroring also has the added disadvantage that Content Providers must insure that all sites remain consistent and current, which is a nontrivial task for even a few sites.

With the present invention, content is automatically replicated to the global server network in an intelligent and efficient fashion. Content is replicated in only those locations where it is needed. Moreover, when the content changes, new copies preferably are replicated automatically throughout the network.

3. Automatic Content Management:

Many existing solutions require active management of content distribution, content replication and load balancing between different servers. In particular, decisions about where content will be hosted must be made manually, and the process of replicating data is handled in a centralized push fashion. On the contrary, the invention features passive management. Replication is done in a demand-based pull fashion so that content preferably is only sent to where it is truly needed. Moreover, the process preferably is fully automated; the ISP does not have to worry about how and where content is replicated and/or the content provider.

4. Unlimited, Cost Effective Scalability:

Competing solutions are not scalable to more than a small number of sites. For example, solutions based on mirroring are typically used in connection with at most three or four sites. The barriers to scaling include the expense of replicating the entire site, the cost of replicating computing resources at all nodes, and the complexity of supporting the widely varying software packages that Content Providers use on their servers.

The unique system architecture of the present invention is scaleable to hundreds, thousands or even millions of nodes. Servers in the hosting network can malfunction or crash and the system's overall function is not affected. The global hosting framework makes efficient use of resources; servers and client software do not need to be replicated at every node because only the hosting server runs at each node. In addition, the global hosting server is designed to run on standard simple hardware that is not required to be highly fault tolerant.

5. Protection against Flash Crowds:

Competing solutions do not provide the Content Provider with protection from unexpected flash crowds. Although mirroring and related load-balancing solutions do allow a Content Provider to distribute load across a collection of servers, the aggregate capacity of the servers must be sufficient to handle peak demands. This means that the Provider must purchase and maintain a level of resources commensurate with the anticipated peak load instead of the true average load. Given the highly variable and unpredictable nature of the Internet, such solutions are expensive and highly wasteful of resources.

The inventive hosting architecture allows ISPs to utilize a single network of hosting servers to offer Content Providers flash crowd insurance. That is, insurance that the network will automatically adapt to and support unexpected higher load on the Provider's site. Because the ISP is aggregating many Providers together on the same global network, resources are more efficiently used.

6. Substantial Bandwidth Savings:

Competing solutions do not afford substantial bandwidth savings to ISPs or Content Providers. Through the use of minoring, it is possible to save bandwidth over certain links (i.e., between New York and Los Angeles). Without global hosting, however, most requests for content will still need to transit the Internet, thus incurring bandwidth costs. The inventive hosting framework saves substantial backbone bandwidth for ISPs that have their own backbones. Because content is distributed throughout the network and can be placed next to network exchange points, both ISPs and Content Providers experience substantial savings because backbone charges are not incurred for most content requests.

7. Instant Access to the Global Network:

Competing solutions require the Content Provider to choose manually a small collection of sites at which content will be hosted and/or replicated. Even if the ISP has numerous hosting sites in widely varied locations, only those sites specifically chosen (and paid for) will be used to host content for that Content Provider.

On the contrary, the global hosting solution of the present invention allows ISPs to offer their clients instant access to the global network of servers. To provide instant access to the global network, content is preferably constantly and dynamically moved around the network. For example, if a Content Provider adds content that will be of interest to customers located in Asia, the Content Provider will be assured that its content will be automatically moved to servers that are also located in Asia. In addition, the global hosting framework allows the content to be moved very close to end users (even as close as the user's building in the case of the Enterprise market).

8. Designed for Global ISPs and Conglomerates:

Most competing solutions are designed to be purchased and managed by Content Providers, many of whom are already consistently challenged and consumed by the administrative and operational tasks of managing a single server. The inventive hosting scheme may be deployed by a global ISP, and it provides a new service that can be offered to Content Providers. A feature of the service is that it minimizes the operational and managerial requirements of a Content Provider, thus allowing the Content Provider to focus on its core business of creating unique content.

9. Effective Control of Proprietary Databases and Confidential Information:

Many competing solutions require Content Providers to replicate their proprietary databases to multiple geographically distant sites. As a result, the Content Provider effectively loses control over its proprietary and usually confidential databases. To remedy these problems, the global hosting solution of the present invention ensures that Content Providers retain complete control over their databases. As described above, initial requests for content are directed to the Content Provider's central Web site, which then implements effective and controlled database access. Preferably, high-bandwidth, static parts for page requests are retrieved from the global hosting network.

10. Compatibility with Content Provider Software:

Many competing solutions require Content Provider s to utilize a specific set of servers and databases. These particular, non-uniform requirements constrain the Content Provider's ability to most effectively use new technologies, and may require expensive changes to a Content Provider's existing infrastructure. By eliminating these problems, the inventive global hosting architecture effectively interfaces between the Content Provider and the ISP, and it does not make any assumptions about the systems or servers used by the Content Provider. Furthermore, the Content Provider's systems can be upgraded, changed or completely replaced without modifying or interrupting the inventive architecture.

11. No Interference with Dynamic Content, Personalized Advertising or E-Commerce, and No stale content:

Many competing solutions (such as naive caching of all content) can interfere with dynamic content, personalized advertising and E-commerce and can serve the user with stale content. While other software companies have attempted to partially eliminate these issues (such as keeping counts on hits for all cached copies), each of these solutions causes a partial or complete loss of functionality (such as the ability to personalize advertising). On the contrary, the global hosting solution does not interfere with generation of dynamic content, personalized advertising or E-commerce, because each of these tasks preferably is handled by the central server of the Content Provider.

12. Designed for the Global Network:

The global hosting architecture is highly scaleable and thus may be deployed on a world-wide network basis.

The above-described functionality of each of the components of the global hosting architecture preferably is implemented in software executable in a processor, namely, as a set of instructions or program code in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a Web "client" should be broadly construed to mean any computer or component thereof directly or indirectly connected or connectable in any known or later-developed manner to a computer network, such as the Internet. The term Web "server" should also be broadly construed to mean a computer, computer platform, an adjunct to a computer or platform, or any component thereof. Of course, a "client" should be broadly construed to mean one who requests or gets the file, and "server" is the entity which downloads the file.

Having described our invention, what we claim is as follows:

1. Computer program code in non-transitory computer readable media for delivering text, graphics, images, downloads, audio or video on behalf of multiple content providers, comprising:
    program code defining a set of content servers associated with a network location; and
    program code defining a name server associated with the network location;
    wherein program code of the name server is adapted to respond to a domain name service (DNS) query to a hostname to issue a first response that includes a first set of one or more IP addresses associated with the set of content servers, the hostname including a serial number defined by a hash map, and wherein a resolution of the hostname to the first set of one or more IP addresses is based on a consistent hashing scheme.

2. The computer program code as described in claim 1 wherein the name server is located in proximity to the set of content servers.

3. The computer program code as described in 1 wherein the hostname is associated with a data string.

4. The computer program code as described in claim 3 wherein the data string is associated with a Uniform Resource Locator (URL) for a content object.

5. The computer program code as described in claim 1 wherein the hash map comprises a set of serial numbers that include the serial number.

6. The computer program code as described in claim 1 wherein one or more objects associated with a page are associated with the hostname that includes the serial number.

7. The computer program code as described in claim 1 wherein the consistent hashing scheme associates the serial number with an initial subset of the content servers to ensure that no content server in the initial subset becomes overloaded.

8. The computer program code as described in claim 7 wherein the consistent hashing scheme modifies the initial subset of the content servers when a server in the subset is found to be overloaded.

9. The computer program code as described in claim 1 wherein the program code for the name server executes on a different physical machine as the program code for one of the content servers.

* * * * *